United States Patent [19]

Boehm et al.

[11] Patent Number: 4,587,885
[45] Date of Patent: May 13, 1986

[54] VACUUM-OPERATED BRAKE POWER BOOSTER

[75] Inventors: Peter Boehm, Frankfurt am Main; Wilfried Wagner, Hattersheim, both of Fed. Rep. of Germany

[73] Assignee: ITT Industries, Inc., New York, N.Y.

[21] Appl. No.: 646,240

[22] Filed: Aug. 29, 1984

[30] Foreign Application Priority Data

Sep. 9, 1983 [DE] Fed. Rep. of Germany ....... 3332546

[51] Int. Cl.4 ............................................. F15B 9/10
[52] U.S. Cl. ................................ 91/376 R; 91/369 A
[58] Field of Search ............. 91/369 C, 369 A, 369 R, 91/369 B, 376 R

[56] References Cited

U.S. PATENT DOCUMENTS 4,472,997  9/1984  Ohmi ................................. 91/369 C
4,475,444 10/1984  Hendrickson ..................... 91/369 C

FOREIGN PATENT DOCUMENTS 2068067  8/1981  United Kingdom ............. 91/369 C

Primary Examiner—Paul E. Maslousky
Attorney, Agent, or Firm—James B. Raden; Donald J. Breh

[57] ABSTRACT

In a vacuum-operated brake power booster, a transverse member is provided which confines the axial movability of the control piston relative to the control housing. The transverse member abuts against a bead of a rubber-elastic material, the bead forming part of the slide-guide ring sealing the booster housing relative to the control housing. The tranverse member is formed of a substantially U-shaped sheet-metal blank, with both free ends of the fork arms extending parallel to two limbs of the member. The arms are provided with hook-shaped tabs which are bendable around a pin forming part of the control housing for the purpose of fixing the transverse member in its aperture in the control housing. In order to enable a proper and easy bending of the tabs during assembly, notches are provided at the radially outside small faces or edges of the two fork arms.

4 Claims, 6 Drawing Figures

VACUUM-OPERATED BRAKE POWER BOOSTER

BACKGROUND OF THE INVENTION

The present invention relates to a vacuum-operated brake power booster with a booster piston sealed relative to the booster housing, and a piston rod coupled to a braking pedal for the actuation of a double valve through which a working chamber of the brake power booster is connectible either to vacuum or to a higher pressure differential. A a first valve is formed by a valve seat at the control housing associated with the booster piston, a poppet valve is pre-loaded in the direction of the valve seat, and a second valve is formed by the same poppet valve and a valve piston connected to the piston rod. The control housing is provided with an aperture protruding through which is a transverse member which confines the axial movability of the valve piston relative to the control housing. The transverse member is provided with a fork portion and at least one limb, which abuts against a stationary part, and the fork portion engages in an annular groove of the valve piston with clearance.

A vacuum-operated brake power booster of the same general type is known by German printed and published patent application No. 31 01 795 A1. This reference discloses a transverse member confined in conjunction with a rod. Return movement is provided through the intermediary of the rod to limit the return movement of the valve piston as the valve piston returns to its return position. In the reference booster, the transverse member is displaceably arranged on the rod and is capable of moving into contact with a shoulder formed at the rear end portion of the rod and with the valve piston when the control housing returns to the return position. The radially inner end of the transverse member is enclosed by an annular groove of the piston, which annular groove is shaped in the valve piston. The transverse member loosely protrudes through an opening situated in the control housing, the opening acting as a part of the connecting channel between the vacuum chamber and the working chamber. This known vacuum-operated brake power booster is disadvantageous in that the transverse member confining the movement of the valve piston acts together with a rod which bears against the housing shells of the booster, as a result whereof the assembly of the transverse member is comparatively difficult and time-consuming. Another disadvantage lies in that the transverse member is designed such that it cannot be used in a brake power booster withou special rods.

Furthermore, a fluid pressure-operated servo motor for a brake power generating device is known by German printed and published patent application No. 30 42 096 A1. In this reference, a sequential control valve includes a vacuum valve seat at the wall element and a displaceable element which is slidingly seated in the wall element and which is functionally connected to a braking pedal actuatable by an operator. An annular valve seat at the displaceable element is movable relative to the vacuum valve seat. A poppet valve element is arranged at the wall element and is normally urged by means of a spring force into abutment with either the vacuum valve seat or the annular valve seat. A transverse member is seated with clearance both in the displaceable element and in the wall element. The member can move into abutment with the housing such that different positions of the vacuum valve seat and the annular valve seat are provided when the movable wall element and the transverse member abut on the housing. As a result, in the open position of the sequential control valve, the vacuum valve seat is lifted by a minimum amount off the poppet valve element.

The transverse member of the reference includes on its outside an annular groove and the wall element has a radial recess. The transverse member is equipped with a fork portion and a finger such that the fork portion is seated with clearance in the annular groove in the displaceable element and in the radial recess in the wall element so that it is capable of moving relative to said elements in the axial direction around the axial length of the annular groove and/or the axial dimension of the radial recess, the finger being arranged such that it can move into abutment with the inside of the housing.

The disadvantage of this known fluid pressure-operated servo motor lies in that the attachment of the transverse member is via a tab bent at right angles, the tab engaging in a recess provided in the hub of the booster piston. The tab is secured against radially outward slippage by means of the radially inside bead of the diaphragm. On removing the transverse member, e.g. in the event of repair work, it is therefore necessary in each case to remove the diaphragm from the hub so that the tab of the transverse member is released and the transverse member can be extracted from the hub.

SUMMARY OF THE INVENTION

It is the object of the present invention to create a vacuum-operated brake power booster, wherein a transverse member abuts against the booster housing in the inoperative position. By this transverse member the valve piston is held and a reduction of lost travel is achieved. In this construction, the transverse member is secured against laterally outward slippage from the conical housing and/or the valve piston. In addition, the abutment of the transverse member against the booster housing can be carried out in a particularly damped manner.

Inventively, this object is achieved in that the slide-guide ring clamping the control housing and held by the booster housing has on its side directed towards the booster piston a bead made of a rubber-elastic material, against which bead the transverse member bears when the double valve is closed.

In a preferred embodiment of the invention, the transverse member is generally U-shaped and formed of a sheet-metal blank. Both free ends of the arms of the fork portion extend parallel to the limbs, the arms being provided with tabs shaped in the forms of hooks, the tabs being bendable around a rib forming part of the control housing, for the purpose of fixing the transverse member to the control housing.

Bending of the tabs is expediently carried out using a pliers-like tool especially provided for that purpose. The step of bending of the tabs has the advantage that the transverse member will no longer be able to slip out of the aperture of the control housing once it has been inserted into the aperture and once the tabs have been bent. Further, bending of the tabs can be effected particularly quickly thus not requiring a great deal of time when assembling the brake booster.

In order to facilitate the bending of the hook-shaped tabs, both ends of the arms of the fork portion extend parallel to both limbs. The arms include notches shaped with the edges facing away from each other or from the small faces of the arms, the tips forming the hooks are shaped at the tab ends to face each other.

The aperture extending transversely through the control housing and housing the transverse member is designed in a first portion as a single recess corresponding to the width of the fork portion having an approximately rectangular area of cross-section. A second portion is constituted by two recesses which extend parallel to each other. The recesses have smaller areas of cross-section than the single recess, and allow passage of the two fork arms which are parallel to each other.

In another embodiment, the fork portion of the U-shaped transverse member has a bore or an oblong hole. Both ends of the arms of the fork portion extend parallel to the limbs and are engaged with the annular groove cut into the valve piston. A bolt is located in the control housing in a bore extending parallel to the longitudinal axis of the control housing. The bolt extends into the aperture and protrudes through the oblong hole in the fork portion of the transverse member. The bore housing the bolt thereby extends from the bottom of the stepped bore for the reaction disc up to the housing-side end face of the aperture for the transverse member.

BRIEF DESCRIPTION OF THE DRAWINGS

This invention is capable of a plurality of embodiments. Two of these will be illustrated in more detail in the accompanying drawings, in which.

DETAILED DESCRIPTION

Figure 1:
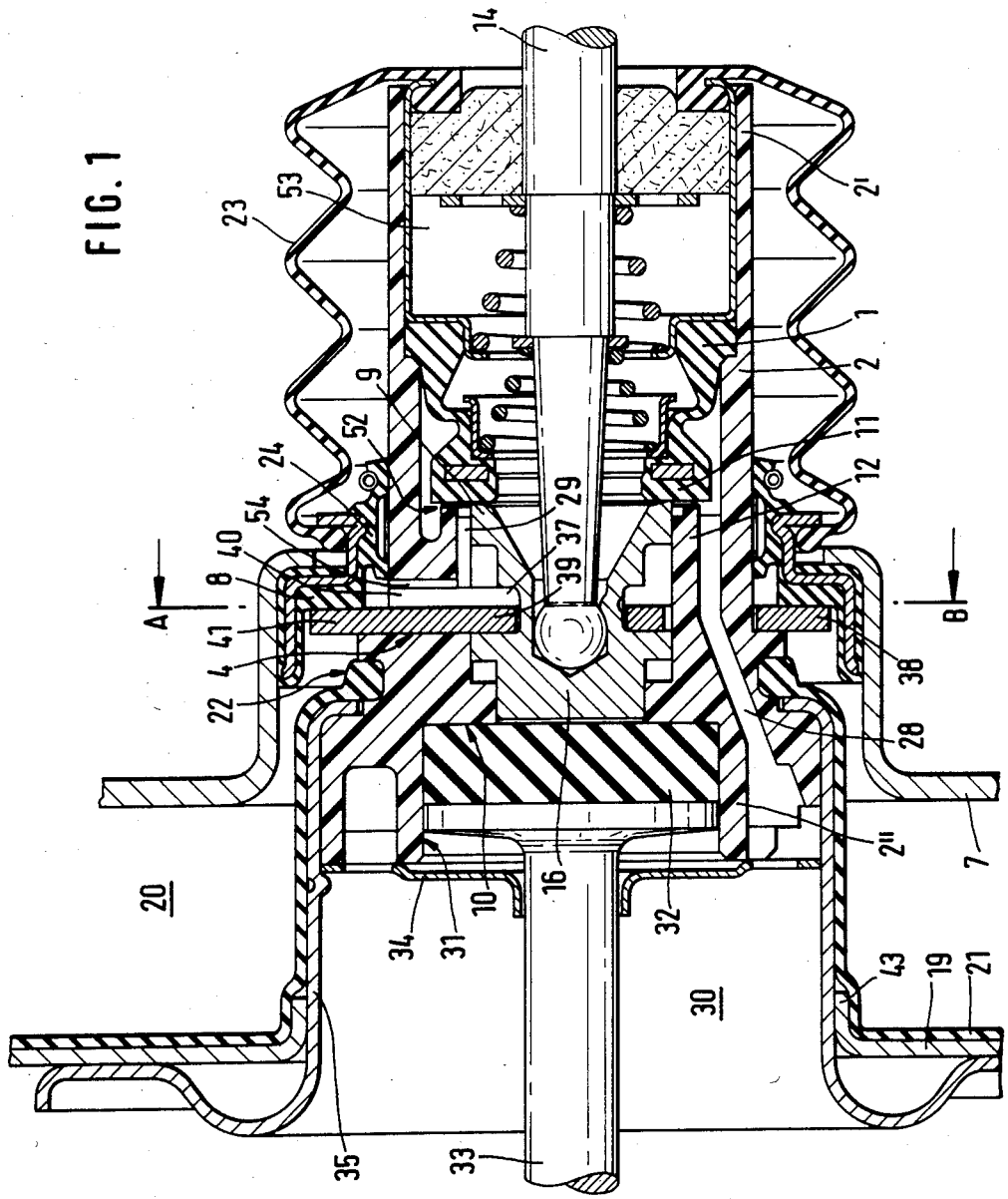
FIG. 1 is a longitudinal cross-section through the control housing sub-assembly of a brake power booster (enlarged view) in the brake release position of a first embodiment.

The housing of the brake power booster of FIG. 1 comprises two housing parts which are, at a junction, interconnected by indentations (only the pedal-side housing part 7 being illustrated to provide clarity). The interior of the housing is sub-divided by means of a control or booster piston 19 into a pressure chamber 30, connected via a connection bore to a vacuum source (not shown), and a working chamber 20. The booster piston 19 includes a rolling diaphragm 21, which is adjacent to the booster piston 19 in the working chamber 20, and a cylindrically shaped control housing 2, which is connected to the booster piston 19 and the rolling diaphragm 21. The rolling diaphragm 21 is pressure-tightly pressed in at the junction 22 and clamps with its inner portion the inner edge 43 of the booster piston 19 and seals the latter relative to the control housing 2. The control housing 2 projects with its cylindrical neck 2' from the booster housing 7 and is guarded against contamination of its surface by the use of a pleated bellows seal 23. The control housing 2 seals the working chamber 20 outwardly through a slide-guide ring 24.

Inside the control housing 2, the control rod comprising the piston rod 14 and the valve piston 16 is axially slidably arranged, the control rod being connectible to a braking pedal of a motot vehicle via a fork head, not illustrated in the drawing. The control housing 2, 2', 2" further comprises a valve arrangement 9, 11, 12 which is actuated by the valve piston 16. Piston 16 controls via the channels 28 and 29 the pressure differential between the vacuum chamber 30 and the working chamber 20.

The part of the control housing 2, 2' arranged in the vacuum chamber or pressure 30 further includes a stepped bore 31 in which a reaction disc 32 and a clamping disc 34 are axially held via a clamping sleeve 35. The push rod 33 actuates a brake master cylinder (not illustrated in further detail) which is attached to the end face of the booster housing bottom.

For resetting the booster piston 19, a return spring (not illustrated in detail) is provided, which is clamped between the clamping sleeve 35 of the booster piston 19 and the bottom of the booster housing.

A transverse member 41 is inserted sideways into the aperture 40, which is transversely arranged and is radially outwardly open towards the working chamber 20. The function of the transverse member 41 is to confine the axial displacement of the valve piston 16 in relation to the control housing 2, 2', 2". In addition, the transverse member 41 insures that the control housing returns in the inoperative position to the position shown in FIG. 1, i.e. it moves in the direction of the braking pedal until control housing 2 abuts via the transverse member 41 against the stationary stop, formed as a bead, 8 at the housing part 7.

Figure 2:
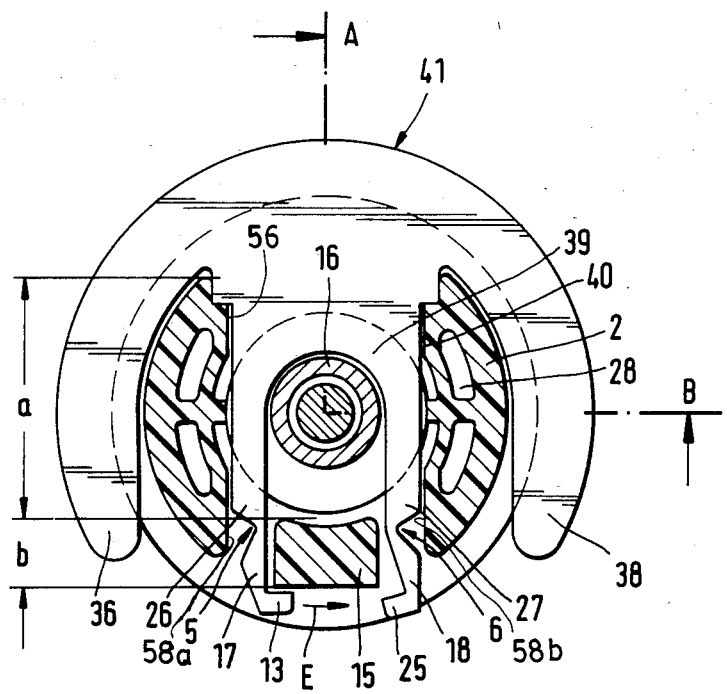
FIG. 2 is a side view of the transverse member in a partially sectioned view, taken on the lines A-B in FIG. 1.

As shown in FIG. 2, the transverse member 41 includes a fork portion 39 and two outer limbs 36, 38 with which the transverse member 41 abuts against the bead 8 of the slide-guide ring 24. The fork portion 39 of the substantially U-shaped transverse member 41 is equipped with two fork arms 26, 27 extending in a radial direction. The ends of said fork arms are provided with hook-shaped tabs 17 and 18, which are bendable around a rib 15 which forms part of the control housing 2, for the purpose of attaching the transverse member 41 to the control housing 2. On the transverse member 41 as shown in FIG. 2, the tab 17 is bent in the direction of arrow E so that the nose or tip 13 of the tab 17 of the fork arm 26 partially clamps the rib 15 from the outside. It is obvious that both tabs 17 and 18 must be bent to achieve an optimal fixation of the transverse member 41.

Figure 5:
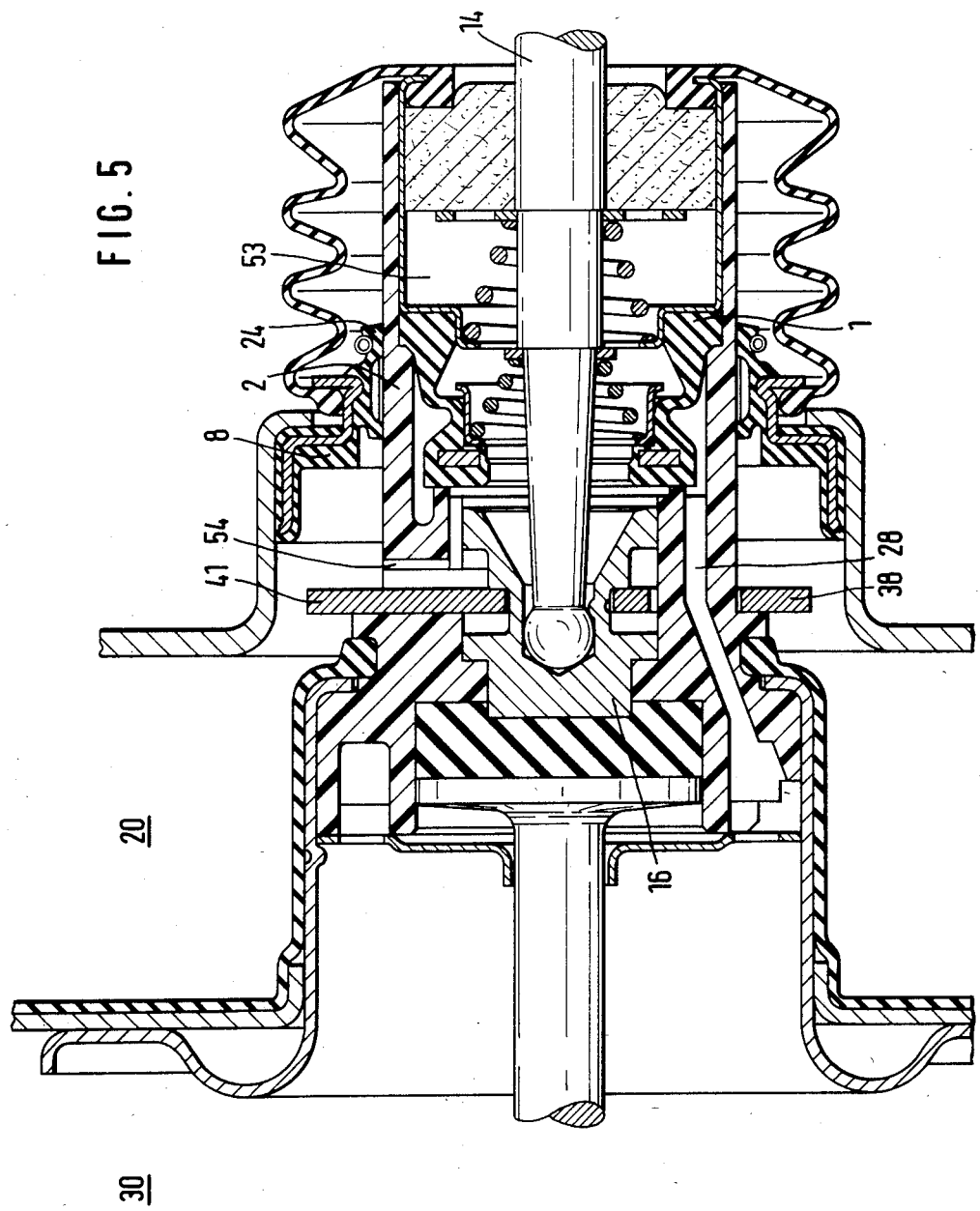
FIG. 5 is a longitudinal cross-section through the control housing sub-assembly of the brake power booster according to FIG. 1 in a maximum braking position.

FIG. 1 shows the control sub-assembly of the brake power booster in the inoperative position, i.e. in a position in which the two chambers 30 and 20 are inter-connected via channels 28 and via a small gap 52 between the poppet valve 1 and the valve seat 12 of the control housing 2 so that the inflow of atmospheric air into the working chamber 20 is prevented. FIG. 5 shows the same control housing sub-assembly in the maximum braking position, with the two chambers 30 and 20 separated from each other, due to the fact that the poppet valve 1 is tightly seated on the valve seat 12 of the control housing 2. The valve piston 16 at the same time is moved to the left so that the atmospheric air passage from the chamber 53 on the right of the oppet valve 1 to the working chamber 20 is open.

Figure 6:
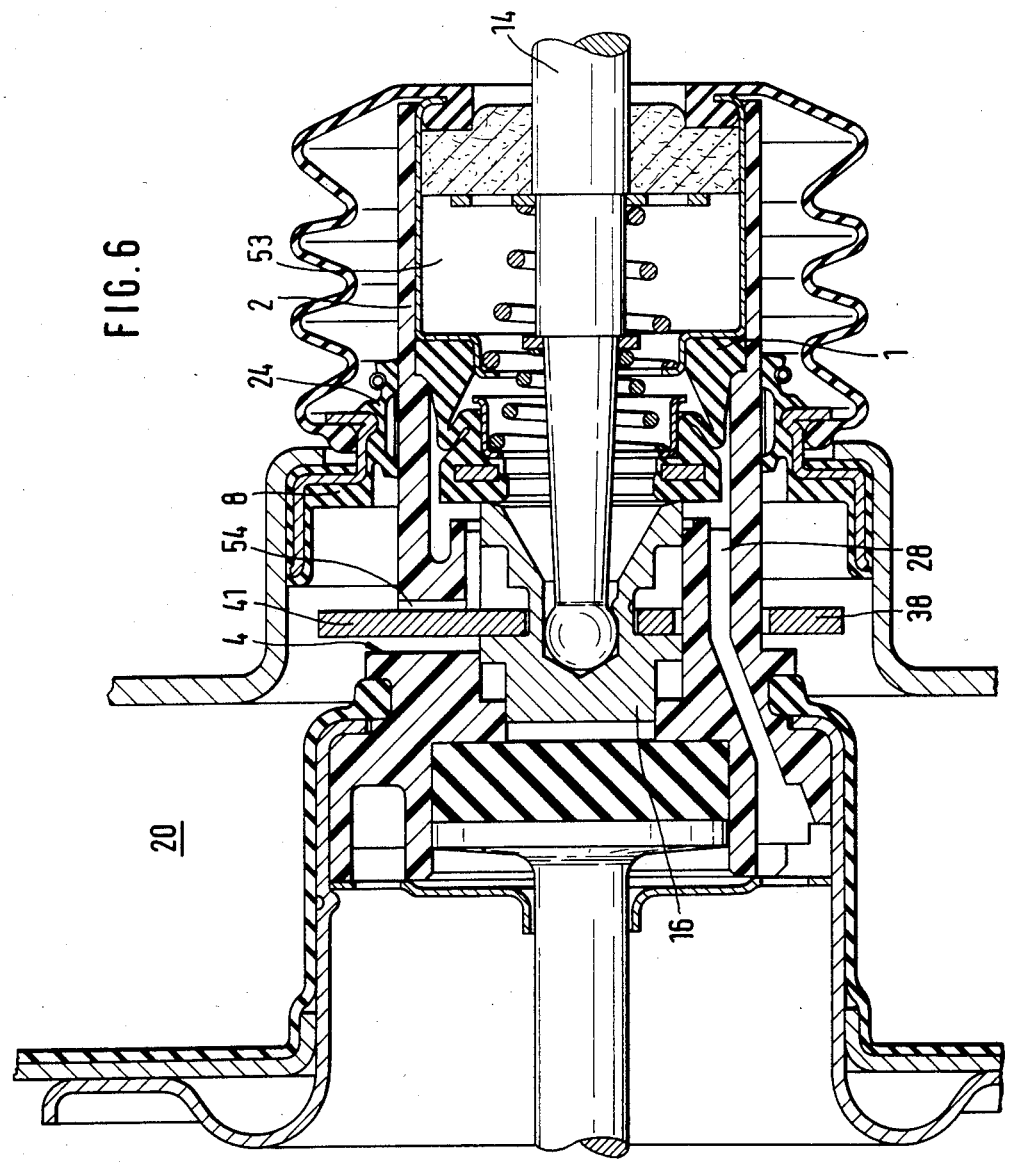
FIG. 6 is a longitudinal cross-section through the control housing sub-assembly of the brake power booster of FIG. 1 in the return position.

FIG. 6 finally shows the return position, i.e. upon completion of the braking action. In this position, the piston 14 moves in the direction of the braking pedal and, in doing so, entrains the valve piston 16 so that the valve passage between the valve seat 9 and the poppet valve 1 is closed. In the illustrated return position, the control housing moves to the right until the transverse member 41 abuts against the bead 8 and the end face 4 of the aperture 40 is adjacent to the side face of the transverse member 41.

Figure 3:
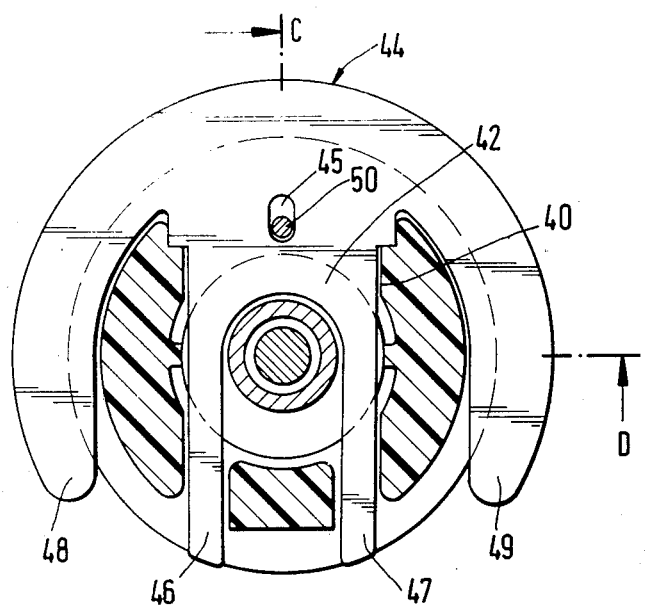
FIG. 3 is a top view of a transverse member of an alternate construction, taken on the lines C-D of the brake force booster according to FIG. 4.
Figure 4:
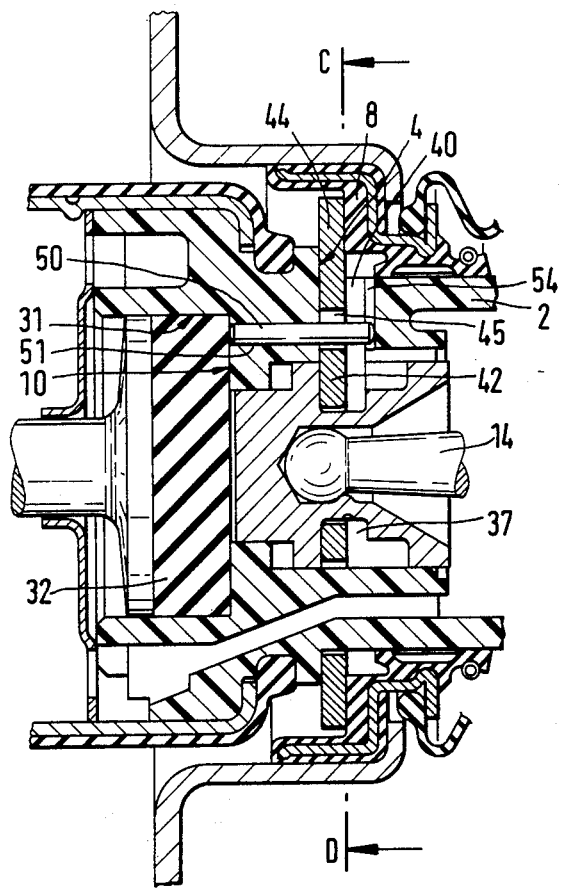
FIG. 4 is a partial longitudinal cross-section through a brake power booster of the alternate embodiment, (in which the transverse member is secured by means of a bolt against a displacement at right angles to the longitudinal direction of the booster)

In the embodiment of the transverse member 44 shown in FIG. 3, an oblong hole 45 is provided within the area of the fork portion 42, instead of the two tabs 17 and 18 of the first embodiment. A bolt 50 is located in the control housing in a bore 51 with the bolt extending from the bottom 10 of the stepped bore 31 to the end face 4 of the aperture 40. The length of the bolt 50 inserted in the bore 51 is dimensioned so that it is held against axial movability both by the reaction disc 32, and by the bottom of a groove 54 in aperture 40.

In comparison with known constructions, the transverse member 41 and/or 44 is advantageous in that it can be quickly assembled and is reliably secured against radial displacement in the aperture 40. After assembling the valve piston 16 with its piston rod 14 and the poppet valve 1, the transverse member 41 is inserted sideways into the aperture 40. As illustrated in FIG. 2, the aperture 40 extends transversely through the control housing 2 and includes a first portion formed as a single recess 56 having a substantially rectangular cross-sectional area corresponding to the width of the fork portion 39 of the transverse number 41. The aperture 40 has a second portion defined by two recesses 58a and 58b which extend parallel to each other and have smaller areas of cross-section than the single recess 56 so as to facilitate passage therethrough with clearance of the two parallel fork arms 26 and 27 of the transverse member 41. The transverse member 41 is subsequently secured in an operation which can be carrried out quickly (in the embodiment of the transverse member 41 according to FIG. 2) either by bending both tabs, 17, 18 or (in the embodiment of the transverse member 44 according to FIG. 3) by inserting the bolt 50 into the bore 51.

What is claimed is:

1. In a vacuum-operated brake power booster comprising a booster piston sealed relative to a booster housing, a piston rod adapted to be coupled to a braking pedal for the actuation of a double valve by which a working chamber of the brake power booster is connectible either to a vacuum or to a higher pressure, a first valve of said double valve being defined by a valve seat formed on a control housing associated with the booster piston and a poppet valve pre-loaded in the direction of the valve seat, and a second valve of said double valve being formed by the same poppet valve and a valve piston connected to the piston rod, the control housing being provided with an aperture through which a transverse member having a peripheral edge surface protrudes, said transverse member acting to confine the axial movability of the valve piston relative to the control housing and protruding radially from the aperture in a manner to abut a stationary stop when the power booster is in an inoperative condition, the improvement wherein a slide-guide ring clamps the control housing and is held by the booster housing, the slide-guide having a side directed towards the booster piston, and a bead made of a rubber-elastic material affixed on said side against which substantially the full peripheral edge surface of the transverse member bears when the power booster is in the inoperative condition.

2. A vacuum-operated brake power booster comprising a booster piston sealed relative to a booster housing, a piston rod adapted to be coupled with a braking pedal for the actuation of a double valve by which a working chamber of the brake power booster is connectible either to a vacuum source or to a higher pressure source, a first valve of said double valve being defined by a valve seat formed on a control housing associated with the booster piston and a poppet valve pre-loaded in the direction of the valve seat, and a second valve of said double valve being defined by the same poppet valve and a valve piston connected to the piston rod, the control housing being provided with an aperture through which a transverse member protrudes to confine the axial movability of the valve piston relative to the control housing, said transverse member defining a fork portion having a pair of generally parallel spaced arms and at least one limb, said fork portion extending with clearance through an annular groove of the valve piston, said transverse member being generally U-shaped and formed of a sheet-metal blank establishing free ends of the arms of the fork portion extending parallel to the limb and having hook-shaped tabs which are bendable around a rib forming part of the control housing for the purpose of fixing the transverse member to the control housing.

3. A vacuum-operated brake power booster according to claim 2 wherein said transverse member includes two limbs, both of said free ends of the arms of the fork portion extending parallel to both limbs, and said arms including notches facilitating bending of the hook-shaped tabs, the notches being shaped with small faces each facing away from the other of the forked arms and with noses forming the hooks being shaped at the ends of the tabs and facing each other.

4. Vacuum-operated brake power booster according to claim 2, in which the aperture extending transversely through the control housing and housing the transverse member has a first portion comprising a single recess corresponding to the width of the fork portion, the first portion having an approximately rectangular cross sectional area, and having a second portion constituted by two recesses extending parallel to each other, said recesses of the second portion having smaller areas of cross-section than the recess of the first portion, the two recesses which allow passage of the two fork arms being parallel to each other.

* * * * *